United States Patent
Plakas et al.

[15] 3,676,584
[45] July 11, 1972

[54] ECHO COINCIDENCE ULTRASONIC SCANNING

[72] Inventors: Chris J. Plakas, 606 Bloomington Road, Champaign, Ill. 61820; Mee See Phua, 65 Hawaii Avenue, Washington, D.C. 20011

[22] Filed: July 13, 1970

[21] Appl. No.: 54,158

[52] U.S. Cl. ............................................. 178/6.8, 128/24 A
[51] Int. Cl. ........................................................ H04n 7/00
[58] Field of Search ............... 340/5 I; 128/24 A; 178/6.8, 178/DIG. 18; 73/67.5, 67.7

[56] References Cited

UNITED STATES PATENTS 3,371,660   3/1968   Carlin ................................. 128/24 A
3,273,148   9/1966   Wood et al. ......................... 340/5 I Primary Examiner—Robert L. Griffin
Assistant Examiner—Barry Leibowitz

[57] ABSTRACT

An ultrasonic visualization system for investigating human tissue structures, comprising pulse generator, power supply, pulse trigger, one transducer which transmits ultrasonic pulses, four transducers, arranged at 90° angles around the center transmitter, which receive reflected echoes, video amplifier and display tube. The output pulses of each pair of receivers 180° apart are connected through time coincidence circuitry to detect echoes originating only at the axis of the ultrasonic beam and to reject multiple reflection echoes, thus echograms of high resolution are obtained.

5 Claims, 1 Drawing Figure

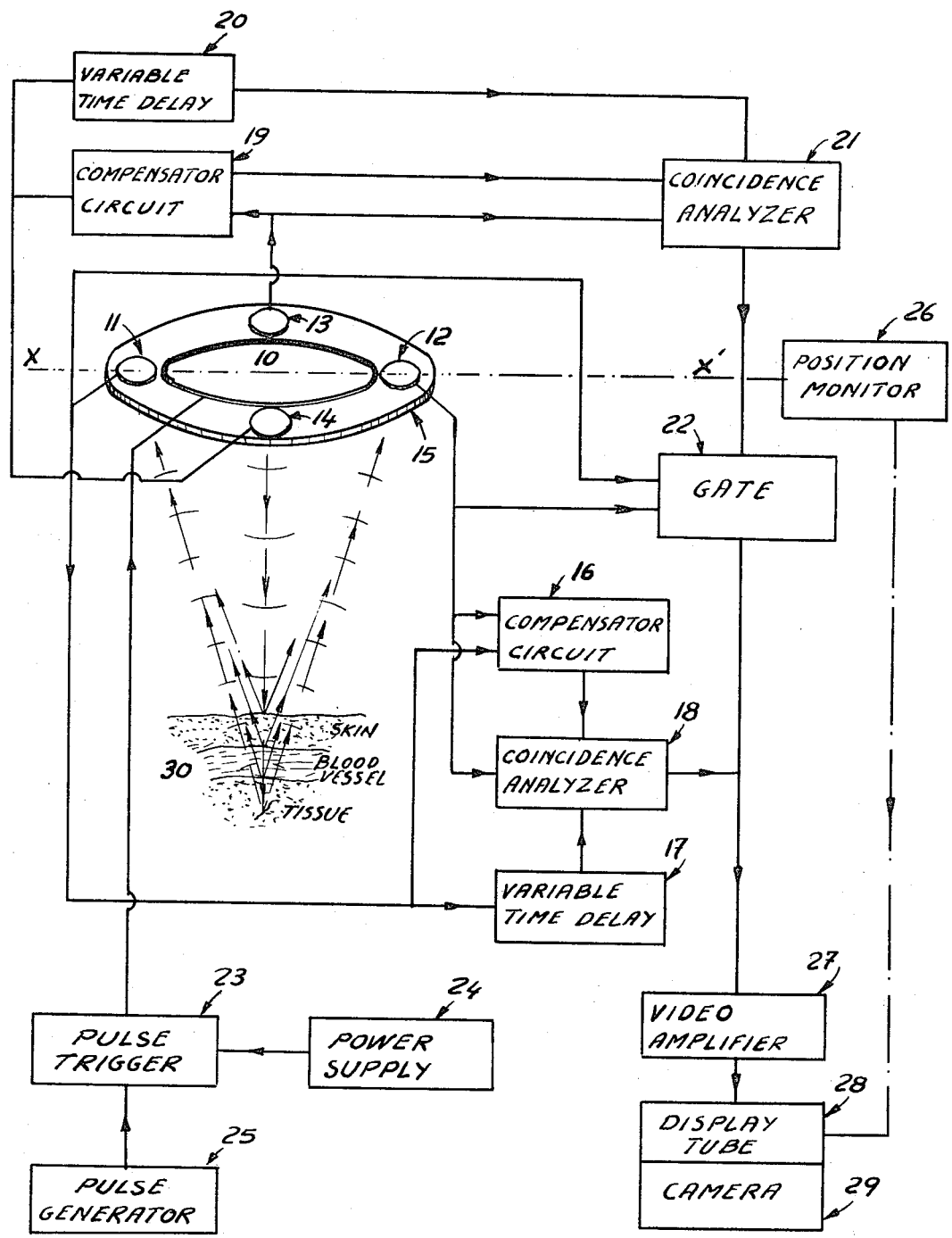

ECHO COINCIDENCE ULTRASONIC SCANNING

FIELD OF THE INVENTION

The present invention relates to an ultrasonic technique for visualization of soft tissue structure and, more specifically, to a method of detecting echoes originating at the impedance discontinuities in the path of an ultrasonic scanning beam and rejecting multiple reflection echoes.

DESCRIPTION OF THE PRIOR ART

In medicine, ultrasonic visualization is a relatively new but dynamic technique with numerous applications in diagnosis and therapy. Ultrasound has been successfully utilized for measuring blood flow rate and determining degree of bone fracture knitting, as well as for echographical investigation of the human brain, eye, mammary gland and fetus development. A detailed description of the research and applications of ultrasonics in medicine may be found in the following selected references: Wells, Peter N. T., *Physical Principles of Ultrasonic Diagnosis*, 1969 and Fry, W. J. and F. Dunn, *Ultrasound, Analysis and Experimental Methods in Biological Research*, 1962. Instrumentation is commercially available from ALOCA Inc. and Nippon Electric Co., Ltd., Japan.

The major disadvantage of current instrumentation is its inability to accurately present details of impedance discontinuities of tissue. Two-dimensional echograms of intracranial, kidney, liver, and other tissue structures are very confusing and it is impossible to distinguish any anatomical structure unless a histological record of the structure of a specific tissue is known. Also, correlation graphs made from a standard medical atlas are necessary at present for interpreting the echograms. This current limitation is partially a result of distortion caused by multiple reflection echoes which do not originate from any impedance discontinuity along the ultrasonic beam. Systems such as compound scanning have been developed in an attempt to compensate for multiple reflection. However, no effective method is available to achieve a visualization echogram free of multiple reflections. Consequently variations of intensities and shifting of echoes due to multiple reflections move the representation of the anatomical position of the tissue structure and the resulting echogram is far from a realistic one.

Since ultrasonic radiation at low power is harmless and painless, ultrasonic visualization has a great potential for future development in medical therapy and diagnostic examination. The advantage of the present invention lies in the application of the concept of echo coincidence which makes it possible to distinguish true echoes originating at the axis of the ultrasonic beam from multiple reflection echoes. Thus, the resulting echograms are of high resolution and offer accurate representations of scanned tissue structures. Although medical application is the main consideration, the echo coincidence technique may be successfully utilized in non-destructive testing of fabricated parts.

SUMMARY OF THE INVENTION

It is therefore an object of the present invention to provide a method of ultrasonic visualization of soft human tissue with high resolution for diagnostic purposes.

Another object of the invention is to provide a means for precisely locating and determining size of nonhomogeneities or flaws in fabricated parts.

Another object of the invention is to provide an application of echo coincidence to ultrasonic visualization systems.

An additional object of the invention is to provide a frame into which transmitter and receivers are associated as one unit for movement over the scanned subject for two-dimensional echograms.

BRIEF DESCRIPTION OF THE DRAWING

These and other objects and aspects of the invention will be further clarified by the following detailed description and accompanying drawing, wherein:

The FIGURE shows the arrangement of the transducers and a block diagram of the electronic units.

DESCRIPTION OF THE PREFERRED EMBODIMENTS

Operating principles of the echo coincidence ultrasonic visualization technique are based on discriminated reception of ultrasonic waves reflected from scanned tissue. As indicated in FIG. 1, the pulse trigger 23, activated every millisecond by pulse generator 25, excites the transmitting transducer 10 with a pulse of 300 volts for one microsecond duration. Transducer 10 converts the electrical impulses into ultrasonic vibrations and transmits them to the scanned subject 30. Ultrasonic echoes reflected from the investigated tissue are detected by the receiving transducers 11–12 and 13–14 and converted into electrical pulses. If the electrical pulses from the receiving transducers appear in time coincidence, an output signal is transmitted by one of the coincidence analyzers 18 or 21 to video amplifier 27 and then gated to a specially made display tube 28. Echoes with significant time-delay are the result of multiple reflections and thus are not recorded.

Transmitting transducer 10 and receiving transducers 11–12 and 13–14 are components of one rigid frame 15 and appear as one unit. Since distilled water is used for coupling medium between transducers and scanned subject, the faces of all transducers must be immerced in water and spaces between transducers and frame are filled with rubber material to eliminate eddy currents of the water which would affect ultrasound propagation. Frame 15 is moved in the XX' direction with a scanning speed between 1 and 8 cm per second. Position monitor 26 traces the displacement of the transducer frame 15 during scanning and moves the sweep line across the screen of the display tube 28 for two-dimensional echograms. A high speed camera 29 with open shutter may be used for permanent recording of the display.

Transmitting transducer 10 is a focusing ceramic transducer of 40 to 60 mm diameter and 2 to 4 MHz frequency, with quarter wave length matching layer and backing. It radiates ultrasonic pulses at a frequency of 1,000 Hz which are focused at a distance of about 16 to 22 cm from the face of the crystal. Ultrasonic pulses reflected from the axis of the ultrasonic beam due to impedance discontinuity of the tissue are detected by the receiving transducers 11–12 and 13–14 made of ceramic material about 20 mm diameter and 10 MHz frequency with quarter wave length matching layer and backing. Receiving transducers 11 and 12 are aligned on the scanning plane facing the focus of the transmitter 10 and are constituents of the coincidence analyzer 18. Receiving transducers 13 and 14 are aligned in a plane perpendicular to the scanning plane facing the transmitter focus and are constituents of the coincidence analyzer 21. When an echo is received simultaneously by receivers 11 and 12 electrical signals flow through the coincidence analyzer 18 and compensator 16 compares and modulates the coincidence signals into a common output which becomes the actual output signal gated by the coincidence analyzer 18 into the video amplifier 27 and then into the display tube 28. Such a simultaneous signal flow from receivers 11 and 12 opens gate 22 and no further signal from coincidence analyzer 21 is permitted to flow into the video amplifier 27. When one of the receivers 11 or 12 receives an echo the coincidence analyzer 18 opens and no further signal flow is permitted from this source. However, the gate 22 closes and the video amplifier 27 may receive output signals from coincidence analyzer 21 of the receivers 13 and 14.

Arrangement of signal flow from coincidence analyzers 18 and 21 to video amplifier 27 has the advantage of recording an impedance discontinuity of tissue which due to its geometrical position reflects a pulse at wide angle toward only receiver 11 or 12. Receivers 13 and 14 may simultaneously receive an echo and consequently coincidence analyzer 21 is permitted by gate 22 which is closed to send signal flow to video amplifier 27 and display tube 28. Resolving time of the coincidence circuits are monitored by variable time-delay units 17 and 20. Thus all true echoes are given proper consideration while most multiple reflections are eliminated. The degree of accuracy of the echogram may be even further increased by adding more gates and more pairs of receiving transducers.

Thus there has been provided a versatile, efficient ultrasonic visualization system utilizing an echo coincidence technique with applications as diverse as medical diagnosis and non-destructive testing. The device is capable of discriminating true echoes from multiple reflections and of providing clear echograms that are accurate representations of the cross sections of scanned subjects. However, the scope of the invention is not limited to the specific embodiments described herein but includes the various alternatives and modifications that fall within the true spirit and scope of the invention as defined by the following claims.

What is claimed is:

1. An utrasonic visualization system providing two dimensional echograms of high resolution through echo coincidence comprising:
   a. transducer means for transmitting ultrasonic pulses comprising one focusing transmitting transducer positioned in the center of a transducer frame, said transmitting transducer converting electrical pulses into acoustical pulses that are propagated through a coupling liquid toward a scanned subject;
   b. transducer means for receiving reflected echoes, said transducer receiving means comprising, an even number of receiving transducers positioned in said transducer frame so as to encircle said transmitting transducer and face at equal distances the focus of said transmitting transducer, said receiving transducers operating in opposite pairs through coincidence circuitry and receiving echoes and converting said echoes from said scanned subject into electrical signals
   c. means for exciting said transmitting transducer
   d. echo coincidence means for analyzing the electrical signals generated by said receiving transducers and for discriminating true echoes from multiple reflections; and
   e. display means for recording accurate representations of cross sections of said scanned subject.

2. The system of claim 1 wherein said means for exciting a transmitting transducer comprises a pulse generator, pulse trigger, and power supply operating in combination to excite said transmitting transducer.

3. The system of claim 1 wherein said echo coincidence means includes pairs of receiving transducers, each pair being connected in coincidence circuit with a coincidence analyzer, a time delay unit, and a compensator, and providing for selection of signals reflected from impedance discontinuities along the axis of an ultrasonic beam and received within a preadjusted time delay, and further providing for amplitude modulation of said signals.

4. The system of claim 1 wherein said echo coincidence means further includes an electronic gate providing for selection of output signal from one coincidence analyzer and permitting flow into a display unit.

5. The system of claim 1 wherein said display means comprises a video amplifier, a display tube, a position monitor including a mechanism for moving said transducer frame with constant scanning speed and an electronic circuit for monitoring said frame's location and accordingly positioning a trace on the screen of said display tube, and a camera providing a permanent record of said echograms.

* * * * *